United States Patent [19]
Bastenhof

[11] 4,120,268
[45] Oct. 17, 1978

[54] DEVICE FOR INJECTING WATER INTO THE CYLINDERS OF AN INTERNAL COMBUSTION ENGINE, PARTICULARLY FOR REDUCING THE DEGREE OF POLLUTION OF THE LATTER

[75] Inventor: Dirk Bastenhof, Eaubonne, France

[73] Assignee: Societe d'Etudes de Machines Thermiques-S.E.M.T., Saint Denis, France

[21] Appl. No.: 799,930

[22] Filed: May 24, 1977

[30] Foreign Application Priority Data

Jul. 2, 1976 [FR] France .............................. 76 20383

[51] Int. Cl.² .............................................. F02D 19/00
[52] U.S. Cl. ................................. 123/25 C; 123/25 M
[58] Field of Search ................ 123/25 C, 25 M, 25 J, 123/25 R, 25 A

[56] References Cited

U.S. PATENT DOCUMENTS

| 898,512 | 9/1908 | Schreber | 123/25 C |
|---|---|---|---|
| 1,491,376 | 4/1924 | Bochet | 123/25 E |
| 3,908,613 | 9/1975 | Loby | 123/25 C |
| 3,933,132 | 1/1976 | Kishishita | 123/25 C |
| 3,990,408 | 11/1976 | Kroll | 123/25 C |

FOREIGN PATENT DOCUMENTS

| 586,713 | 4/1925 | France | 123/25 CU |
|---|---|---|---|
| 759,822 | 2/1934 | France | 123/25 CU |

*Primary Examiner*—Ira S. Lazarus
*Attorney, Agent, or Firm*—Kenyon & Kenyon, Reilly, Carr & Chapin

[57] ABSTRACT

A device for injecting water into one cylinder of an internal combustion engine, in order to reduce the temperature of said cylinder and thus to avoid the nitrogen compounds (NOx) in the exhaust gases; said device comprising a pump connected to an injector which opens into said cylinder and an actuating mechanism for said pump coupled to a selected point of the intake control position of the engine valve actuating system.

4 Claims, 3 Drawing Figures

DEVICE FOR INJECTING WATER INTO THE CYLINDERS OF AN INTERNAL COMBUSTION ENGINE, PARTICULARLY FOR REDUCING THE DEGREE OF POLLUTION OF THE LATTER

The present invention has essentially for its object a device allowing water to be injected in small amounts into the cylinders of an engine in synchronism with its operating cycle. The purpose of the invention is particularly to reduce in that manner the pollution of the engine and specifically to reduce the portion of nitrogen oxides in the exhaust gases.

As is known, it is of interest, in many respects, to efficiently control the temperature of the cylinders of an internal combustion engine in operation, in order, more particularly, to prevent the said temperature from exceeding certain limits. It is well known, for example, that the most detrimental components of the exhaust gases are the nitrogen compounds of the general formula (NOx) and a number of investigations have been undertaken with a view to eliminating such compounds. Among all the solutions that have been proposed, one of the most rational consists precisely in controlling the temperature of the engine cylinders as a matter of fact in reducing the same so as to generally prevent it from exceeding the critical threshold above which the nitrogen compounds are produced in important amounts. It is generally considered that such critical threshold ranges about 1500° C. Moreover, it is generally observed that when the temperature of the engine cylinders is maintained within such limits a better efficiency is ensured and the main engine parts thus maintained at an adequate temperature withstand better and longer the forces and stresses of all kinds to which they are subjected. This results in reducing engine wear. The invention allows all these advantages to be obtained by the fact that, in order to allow the temperature of the cylinders to be controlled, a predetermined amount of water is sequentially introduced into the cylinders at a selected moment of the operating cycle of the cylinder, preferably in synchronism with at least the beginning of the compression stage in each operating cycle.

More specifically, the invention relates to a device for injecting water into at least one cylinder of an internal combustion engine, particularly for anti-pollution purposes, characterized in that a mechanism for operating the means of water injection into the said cylinder is coupled to a selected point of the intake control portion of the valve actuating system of the said engine, comprising the cam shaft, the push-rod, the rocker-arm and the intake valve of the said cylinder.

In a preferred form of embodiment of the said water injection means, the said means comprise a pump of the type including a piston and a check or non-return valve at the inlet, the inlet of which is connected to a water supply and the outlet of which is connected to a nozzle assembly or injector provided with a check or non-return valve and opening into the internal space of the said cylinder. The said selected point of the intake control portion of the valve actuating system is preferably the rockerarm of the cylinder considered.

The invention will be better understood and other purposes, details and advantages of the latter will appear more clearly from the following explanatory description of a device according to the invention, given solely by way of example with reference to the appended non-limitative drawings wherein.

Figure 1:
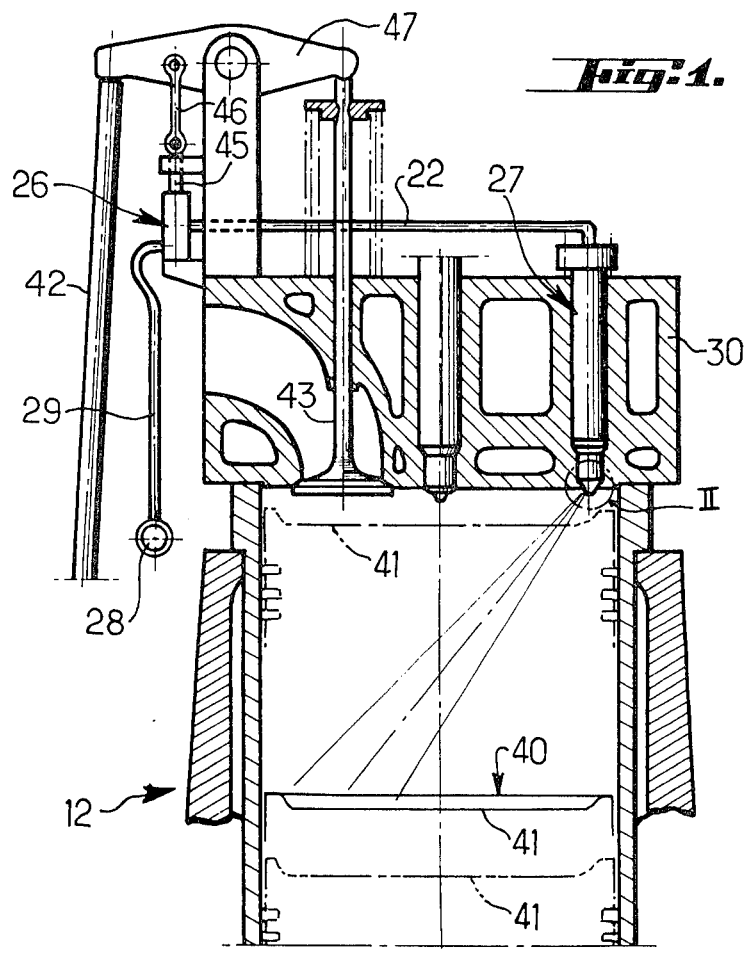
FIG. 1 is a partial sectional view of an engine cylinder provided with means for injecting water into the said cylinder in synchronism with its operating cycle.
Figure 2:
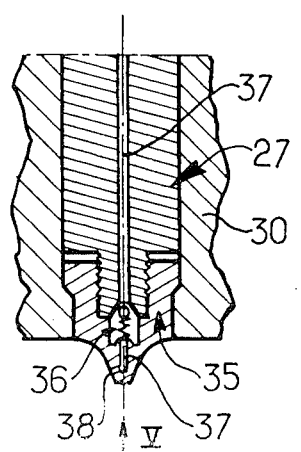
FIG. 2 is a detailed view, shown in section and to a larger scale, of the encircled portion II of FIG. 1.
Figure 3:
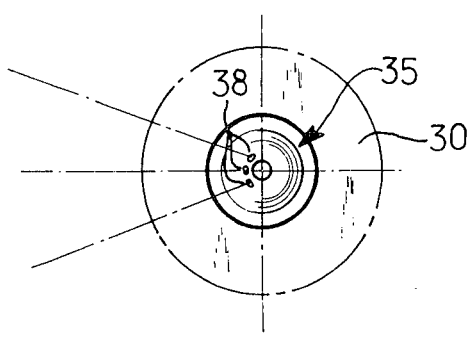
FIG. 3 is a view from below of the portion shown in FIG. 2.

FIGS. 1 to 3 show the structure of the means associated with each engine cylinder 12, allowing water to be injected therein in synchronism with the operating cycle of the said cylinder. The common conduit 28 is connected to a water supply (not shown) and supplies the piston-type pump 26 provided with a check or non-return valve at its inlet, through the medium of a conduit element 29 connected to the common conduit 28. It is readily understood that in the case of an engine including several cylinders a pump such as 26 is associated with each cylinder such as 12 and supplied with water through the common conduit 28 through the medium of a conduit element such as 29. The outlet of pump 26 is connected through the medium of a conduit element 22 to the corresponding nozzle assembly or injector 27 passing through the cylinder head 30 and opening into the upper portion of the combustion chamber of cylinder 12. FIGS. 2 and 3 show more particularly the structure of the end portion of the nozzle assembly or injector 27, the nozzle 35 of which contains a check or non-return valve, such as a ball valve 36 intercalated in the water supply conduit 37 which communicates with one or preferably several laterally inclined nozzle orifices 38. Several nozzle orifices such as 38 (FIG. 3) are preferably provided to obtain several distinct jets in order to distribute the amount of water injected during each cycle over the greater portion of the transverse surface 40 of piston 41 when the latter is in a definite position of its travel (shown in strong lines in FIG. 1) corresponding to a selected moment of each operating cycle, i.e., in the example considered, the beginning of the compression stage. There is thus more particularly ensured a uniform cooling of the piston. The two other positions of piston 41 shown in phantom lines in FIG. 1 correspond to the upper dead centre on the one hand and to the lower dead centre on the other; they are shown in order to better illustrate the position at the moment of injection of the water.

Injection synchronism is ensured in a quite simple manner. According to the invention, the actuating rod 45 of pump 26 is mechanically connected (through the medium of a transmission system diagrammatized by a link 46) to the rocker-arm 47 of the corresponding cylinder 12. As a matter of fact the actuating mechanism of the pump 26 may quite as well be mechanically coupled to another selected point of the intake control portion of the valve actuating system of the engine, comprising: the camshaft (not shown), the push-rod 42, the rocker-arm and also the intake valve 43.

The operation of the device is quite simple and is obviously inferred from the foregoing description. The water reaching the inlet of the pump 26 through the medium of the common conduit 28 and the conduit element 29 is delivered, on each movement of the rocker-arm 47, towards the corresponding nozzle assembly 27. Thus, the injection of water into each cylinder at the appropriate moment, i.e. in synchronism with the beginning of the compression stage of the operation of the cylinder considered, allows the temperature of the combustion chamber and the piston to be maintained at a lower value than the critical threshold above which undesirable nitrogen compounds are produced in important amounts. The other previously mentioned advantages of the invention also result from such control of the temperature of the combustion chamber.

Of course, the invention is by no means limited to the form of embodiment of the device just described, it comprises all the technical equivalents used, should the latter be used within the scope of the following claims.

What is claimed is:

1. In an internal combustion engine having at least one cylinder, a piston reciprocable in the cylinder, at intake valve for the cylinder, means for actuating the intake valve to open during each intake stage of the combustion cycle in the cylinder for admitting combustion air into the cylinder and to shut at approximately the beginning of each compression stage of the combustion cycle, a device for injecting a predetermined amount of water into the cylinder, and means for actuating the water injection device during a predetermined portion of the combustion cycle in the cylinder, the improvement wherein the means for actuating the water injection device is operatively coupled to the means for actuating the intake valve for actuating the water injection device to inject said predetermined amount of water in synchronization with the shutting of the intake valve at the beginning of the compression stage of the combustion cycle in the cylinder, the predetermined amount of water maintaining the temperature in the cylinder below the critical value for significant nitrogen oxide production, with consequent reduction of pollution from the engine.

2. In an internal combustion engine having at least one cylinder, a piston reciprocable in the cylinder, an intake valve for the cylinder, a push rod and rocker arm for actuating the intake valve to open during each intake stage of the combustion cycle in the cylinder for admitting combustion air into the cylinder and to shut at approximately the beginning of each compression stage of the combustion cycle, a nozzle assembly for injecting water into the cylinder, a pump having an inlet connected to a water supply and an outlet connected to the nozzle, and means for actuating the pump to deliver a predetermined amount of water to the nozzle during a predetermined portion of the combustion cycle in the cyliner, the improvement wherein the means for actuating the pump is coupled to the rocker arm for actuating the pump to deliver the predetermined amount of water to the nozzle assembly in synchronization with the shutting of the intake valve at the beginning of the compression stage of the combustion cycle in the cylinder, the predetermined amount of water maintaining the temperature inside the cylinder below the critical temperature for significant nitrogen oxide production, thereby reducing pollution from the engine.

3. In an internal combustion engine according to claim 2 wherein the means for actuating the pump comprises a link member hingedly connected to the intake valve rocker arm of said cylinder.

4. In an internal combustion engine according to claim 2 wherein the nozzle assembly comprises a nozzle provided with a plurality of nozzle orifices to produce a corresponding plurality of distinct jets within said cylinder, said jets being directed toward the transverse surface of the piston, thereby providing uniform cooling of the piston.

* * * * *